United States Patent
Lundsted Poulsen

(10) Patent No.: US 11,293,493 B2
(45) Date of Patent: Apr. 5, 2022

(54) FLEXIBLE BEARING RETAINER FOR MULTISTAGE CENTRIFUGAL PUMP

(71) Applicant: Grundfos Holding A/S, Bjerringbro (DK)

(72) Inventor: Brian Lundsted Poulsen, Langaa (DK)

(73) Assignee: Grundfos Holding A/S, Bjerringbro (DK)

(*) Notice: Subject to any disclaimer, the term of this patent is extended or adjusted under 35 U.S.C. 154(b) by 161 days.

(21) Appl. No.: 16/473,472

(22) PCT Filed: Dec. 26, 2017

(86) PCT No.: PCT/DK2017/050452
§ 371 (c)(1),
(2) Date: Jun. 25, 2019

(87) PCT Pub. No.: WO2018/121827
PCT Pub. Date: Jul. 5, 2018

(65) Prior Publication Data
US 2019/0368548 A1  Dec. 5, 2019

(30) Foreign Application Priority Data
Dec. 28, 2016  (EP) .................................. 16207125

(51) Int. Cl.
*F04D 29/046* (2006.01)
*F16C 27/02* (2006.01)
(Continued)

(52) U.S. Cl.
CPC .......... *F16C 37/002* (2013.01); *F04D 29/046* (2013.01); *F16C 17/22* (2013.01);
(Continued)

(58) Field of Classification Search
CPC ........ F04D 29/046; F16C 27/02; F16C 35/02; F16C 2360/44
See application file for complete search history.

(56) References Cited

U.S. PATENT DOCUMENTS 1,384,173 A * 7/1921 Wikander ............... F16C 17/18
  384/280
2,956,841 A * 10/1960 Steele, III ............. F04D 29/047
  384/215
(Continued)

FOREIGN PATENT DOCUMENTS

DE     903762 C    2/1954
FR     2169469 A5  9/1973
FR     2532700 A1  3/1984

OTHER PUBLICATIONS

Extended European Search Report; European Patent Office; European Application No. 16207125.2; dated Mar. 28, 2017; 8 pages.
(Continued)

*Primary Examiner* — Michael Lebentritt
*Assistant Examiner* — Brian Christopher Delrue
(74) *Attorney, Agent, or Firm* — Taft Stettinius & Hollister LLP

(57) ABSTRACT

The present invention relates to a centrifugal pump and a bearing retainer for the centrifugal pump. The centrifugal pump has a shaft, a bearing for supporting the shaft, and a bearing retainer for the bearing. The bearing retainer comprises a ring section adapted to surround the bearing and an elastic section adjacent the ring section, wherein the elastic section comprises multiple slits, dividing the elastic section into multiple resilient parts, wherein the multiple resilient parts are adapted to receiving and supporting the bearing, thereby creating a compression force in radial direction perpendicular to the axis of the shaft, allowing the bearing retainer to hold the bearing in a fixed position with respect to the bearing retainer.

14 Claims, 17 Drawing Sheets

(51) Int. Cl.
*F16C 37/00* (2006.01)
*F16C 35/02* (2006.01)
*F16C 33/04* (2006.01)
*F16C 17/22* (2006.01)

(52) U.S. Cl.
CPC .............. *F16C 27/02* (2013.01); *F16C 33/04* (2013.01); *F16C 35/02* (2013.01); *F16C 2360/44* (2013.01); *Y10S 384/905* (2013.01)

(56) References Cited

U.S. PATENT DOCUMENTS

| | | | | |
|---|---|---|---|---|
| 3,829,184 | A | * | 8/1974 | Chevret .................. F16C 27/02 |
| | | | | 384/280 |
| 3,936,101 | A | * | 2/1976 | McDonald ............... B62D 3/02 |
| | | | | 384/222 |
| 5,062,721 | A | * | 11/1991 | Chiba .................... F16C 33/28 |
| | | | | 384/536 |
| D380,959 | S | * | 7/1997 | Mitchell ...................... D15/143 |
| 6,238,127 | B1 | * | 5/2001 | Jhumra ..................... F16B 5/02 |
| | | | | 403/282 |
| 10,113,602 | B2 | * | 10/2018 | Stanescu ................. F16B 43/02 |
| 11,005,334 | B2 | * | 5/2021 | Childs ..................... B32B 3/266 |
| 2008/0152548 | A1 | | 6/2008 | Godleski |
| 2018/0283457 | A1 | * | 10/2018 | Plioska .................. F16C 29/12 |

OTHER PUBLICATIONS

International Search Report; European Patent Office; International Application No. PCT/DK2017/050452; dated Mar. 7, 2018; 4 pages.
Written Opinion of the International Searching Authority; European Patent Office; International Application No. PCT/PCT/DK2017/050452; dated Mar. 7, 2018; 5 pages.
International Preliminary Report on Patentability; The International Bureau of WIPO; International Application No. PCT/DK2017/050452; dated Jul. 2, 2019; 6 pages.
Communication pursuant to Article 94(3) EPC; European Patent Office; European Application No. 17828838.7; dated Jun. 10, 2021; 5 pages.

* cited by examiner

FLEXIBLE BEARING RETAINER FOR MULTISTAGE CENTRIFUGAL PUMP

CROSS-REFERENCE TO RELATED APPLICATIONS

This application is a U.S. National Phase of International PCT Application No. PCT/DK2017/050452 filed on Dec. 26, 2017, which claims priority to European Patent Application No. 16207125.2 filed Dec. 28, 2016, each of which are incorporated herein by reference in their entirety.

The present invention relates to a centrifugal fluid pump and a bearing retainer for a centrifugal fluid pump. In particular, it relates to a multistage centrifugal pump and a bearing retainer for a multistage centrifugal pump.

TECHNICAL BACKGROUND

Multi-stage centrifugal pump units are described in the patent applications US 2012/0251308 A1 and US 2016/0108922 A1.

The U.S. Pat. No. 2,956,841 concerns a bearing and a mounting for the bearing, in particular a sleeve-type bearing which is thermally expansible. The bearing is allegedly particularly for use with a liquid metal motor-pump combination. The patent relates to a bearing assembly using a plurality of circumferentially spaced leaf springs. The patent inter alia aims at providing means for permitting relative thermal expansion.

The JP patent application H08-170646 (Leading to JP2711434) concerns the problem of preventing a slide bearing and a rotation shaft from corotating in a high temperature environment. The problem is allegedly solved by interposing a spacer between a slide bearing formed of ceramics and a holding member formed of metal with a coefficient of thermal expansion larger than the bearing. The spacer is cylindrical and formed of metal with a coefficient of thermal expansion larger than the holding member. Thermal expansion of the thickness of the spacer compensates the difference between the thermal expansion of the slide bearing and the holding member. The spacer may comprise slits, allowing absorbing the expansion of the spacer along the circumferential direction of the spacer.

The U.S. Pat. No. 7,056,027 B2 concerns a bearing for rotatably supporting a cylindrical shaft within a frame cylindrical support surface in which the shaft is subject to thermal expansion, the bearing being deformable within elastic limits permitting the internal diameter of the bearing surface to expand to accept thermal expansion of the shaft.

The U.S. Pat. No. 2,506,404 B2 concerns a bearing assembly for rotating apparatus, which bearing assembly comprises a housing member, a bearing positioned in said housing member and spaced from an end wall thereof, a resilient cap member positioned in the opening between said end wall and said bearing and having resilient spring fingers engaging a circumferential surface of said surface of said housing and the outer surface of said bearing for applying radial pressure thereto.

The U.S. Pat. No. 4,981,390 B2 concerns a tolerance ring with radial projections to achieve unidirectional or bidirectional axial retention, or angular retention relative to at least one abutting cylindrical surface.

The manufacturing of bearings, and retainers or holders for bearings, usually requires very strict production tolerances. There is a need to relax the production tolerances to reduce costs of manufacturing.

SUMMARY OF THE INVENTION

Against this background, a bearing retainer has been developed. The bearing retainer of the invention comprises sections, which are flexible in a radial direction, allowing receiving and holding a bearing.

This provides for a bearing retainer wherein the production tolerances are larger than for a traditional, rigid bearing retainer. Further, a bearing retainer of the invention may be used at elevated temperatures and retain contact with a bearing in spite of different thermal expansion coefficients of bearing retainer and bearing.

According to an aspect, the present invention concerns a centrifugal pump having a shaft and a bearing for supporting said shaft, said centrifugal pump further comprising a bearing retainer for said bearing, wherein said bearing retainer comprises: at least one ring section adapted to surround the bearing, said ring section having an inner radius perpendicular to the axis of said shaft; at least one elastic section adjacent said ring section, wherein at least a part of said elastic section has an inner radius perpendicular to the axis of said shaft, which inner radius is smaller than said radius of said ring section; said elastic section comprising multiple slits, dividing said elastic section into multiple resilient parts; said multiple resilient parts being adapted to allowing receiving and supporting the bearing, thereby creating a compression force in radial direction perpendicular to the axis of said shaft, allowing said bearing retainer to hold the bearing in a fixed position with respect to said bearing retainer.

According to an aspect, the present invention concerns a centrifugal pump having a shaft and a bearing for supporting said shaft, said centrifugal pump further comprising a bearing retainer for said bearing, wherein said bearing retainer comprises: at least one ring section adapted to surround the bearing, said ring section having an inner radius perpendicular to the axis of said shaft; at least one elastic section adjacent said ring section, wherein at least a part of said elastic section has an inner radius perpendicular to the axis of said shaft, which inner radius is smaller than said radius of said ring section; said elastic section comprising multiple slits, dividing said elastic section into multiple resilient parts; said multiple resilient parts being adapted to allowing receiving and supporting the bearing, thereby creating a compression force in radial direction perpendicular to the axis of said shaft, allowing said bearing retainer to hold the bearing in a fixed position with respect to said bearing retainer; wherein said elastic section comprises an oblique subsection adjacent said ring section, and a cylindrical subsection adjacent said oblique subsection, wherein said oblique subsection comprises a wall which is slanted with respect to the shaft of the pump, and said cylindrical subsection comprises a wall which is parallel to the shaft of the pump.

The centrifugal pump is preferably a centrifugal fluid pump. The fluid is preferably a liquid.

According to another aspect, the present invention concerns a bearing retainer for a bearing for supporting the shaft of a pump, said bearing retainer comprising: at least one ring section adapted to surround the bearing, said ring section having an inner radius perpendicular to the axis of the shaft; at least one elastic section adjacent said ring section, wherein at least a part of said elastic section has an inner radius perpendicular to the axis of the shaft, which inner radius is smaller than said radius of said ring section; said elastic section comprising multiple slits, dividing said elastic section into multiple resilient parts; said multiple resilient parts being adapted to allowing receiving and supporting the bearing, thereby creating a compression force in radial direction perpendicular to the axis of the shaft, allowing said bearing retainer to hold the bearing in a fixed position with respect to said bearing retainer.

According to another aspect, the present invention concerns a bearing retainer for a bearing for supporting the shaft of a pump, said bearing retainer comprising: at least one ring section adapted to surround the bearing, said ring section having an inner radius perpendicular to the axis of the shaft; at least one elastic section adjacent said ring section, wherein at least a part of said elastic section has an inner radius perpendicular to the axis of the shaft, which inner radius is smaller than said radius of said ring section; said elastic section comprising multiple slits, dividing said elastic section into multiple resilient parts; said multiple resilient parts being adapted to allowing receiving and supporting the bearing, thereby creating a compression force in radial direction perpendicular to the axis of the shaft, allowing said bearing retainer to hold the bearing in a fixed position with respect to said bearing retainer; wherein said elastic section comprises an oblique subsection adjacent said ring section, and a cylindrical subsection adjacent said oblique subsection, wherein said oblique subsection comprises a wall which is slanted with respect to the shaft of the pump, and said cylindrical subsection comprises a wall which is parallel to the shaft of the pump.

According to an aspect, the present invention concerns a bearing connected to a bearing retainer according to the invention.

According to an aspect, the present invention concerns a combination of a bearing retainer with a bearing, wherein said combination is obtainable by inserting or pressing a bearing into a bearing retainer according to the invention.

According to an aspect, the present invention concerns a centrifugal pump comprising a bearing retainer according to the invention, a bearing according to the invention, or a combination of a bearing retainer with a bearing according the invention.

According to an aspect, the present invention concerns a use of a bearing retainer according to the invention, a bearing according to the invention, or a combination of a bearing retainer with a bearing according to the invention, for supporting a bearing stabilizing the shaft of a centrifugal pump.

The expression "axis of the shaft" refers to the axis of rotation of the shaft.

The term "radius" is used about the distance from the axis of rotation of the shaft of the pump to specific parts such as of the bearing retainer, even that the specific parts and/or the bearing retainer may not be circular.

The term "multiple" means more than one.

The term "slit" is here used about a long, narrow cut or opening in a material, such as metal. A slit may provide improved resilience or elasticity of the remaining material. A slit may be along a line or it may have other shapes, such as being curved, C-shaped, S-shaped or shaped like a wave.

A bearing retainer of the invention may be made by any conventional method, and may also be manufactured by 3D printing. 3D printing facilitates manufacturing of complicated shapes.

It is preferred that the bearing retainer is integrally formed, but it may consist of more than one part.

It is preferred that the ring section and the elastic section are positioned adjacent along an axis parallel to the shaft.

After insertion of the bearing into the bearing retainer, the bearing will be held by the multiple resilient parts, acting as leaf springs or arc shaped springs providing compression against the side of the bearing. In this way, the bearing is held by compression forces, after being inserted or pressed into the bearing retainer. This provides a bearing retainer for which the production tolerances are larger than for a traditional bearing retainer. A traditional bearing retainer has dimensions which need to be accurately adjusted to the dimensions of the bearing. The resilient parts of the present invention allows a wider tolerance in the manufacturing of the bearing retainer as well as the bearing.

The term ring section does not necessarily imply circular, but may be other shapes such as elliptical, corrugated or wave formed. Preferably the bearing retainer is not cylindrical.

A bearing retainer of the invention is particularly useful for a pump, which is a multistage centrifugal pump.

A bearing retainer of the invention may be fixed with respect to the rest of a pump with any conventional means, such as by welding, or it may e.g. be placed in a holder, which is fixed with respect to the pump.

According to an embodiment, a bearing retainer of the invention is welded to the inner guide cup of a guiding chamber of a centrifugal pump.

According to an embodiment, the present invention concerns a centrifugal pump or bearing retainer of the invention, wherein said ring section comprises a closed or an open ring.

The ring section may optionally comprise a longitudinal aperture, facilitating insertion into a holder of the bearing retainer. This is in particular useful if the bearing retainer acts as a spacer between a holding member and a bearing.

According to an embodiment, the present invention concerns a centrifugal pump or bearing retainer of the invention, wherein the bearing supports the shaft directly or indirectly.

According to an embodiment, the present invention concerns a centrifugal pump or bearing retainer of the invention, wherein said ring section is stiffer than said elastic section.

According to an embodiment, the present invention concerns a centrifugal pump or bearing retainer of the invention, wherein said elastic section comprises an oblique subsection adjacent said ring section, and a cylindrical subsection adjacent said oblique subsection, wherein said oblique subsection comprises a wall which is slanted with respect to the shaft of the pump, and said cylindrical subsection comprises a wall which is parallel to the shaft of the pump.

In this embodiment, the slanted wall may be straight, linear and/or curved. In the latter case, the slanted wall may form a curved slope, connecting the ring section with the cylindrical subsection.

The oblique subsection provides for an improved resilience of the resilient parts. The bearing retainer may have an even wall thickness, providing improved strength. The oblique subsection may provide or allow for the production of a bearing retainer with even wall thickness. The oblique subsection may provide a more resilient mounting of the bearing. The oblique subsection may provide a high radial interference, which will be particularly suitable for high temperatures and/or large differences of temperatures.

According to an embodiment, the present invention concerns a centrifugal pump or bearing retainer of the invention, wherein the bearing retainer has an even wall thickness. An even wall thickness may provide improved strength to the bearing retainer.

According to an embodiment, the present invention concerns a centrifugal pump or bearing retainer of the invention, wherein the at least one ring section (2) comprises a wall, and the at least one elastic section (4) comprises a wall; and wherein the wall of the at least one ring section (2) and the wall of the at least one elastic section (4) has substantially the same and even wall thickness.

According to an embodiment, the present invention concerns a centrifugal pump or bearing retainer of the invention, wherein the wall of said oblique subsection (17) and the wall of said cylindrical subsection (18) has substantially the same and even wall thickness.

According to an embodiment, the present invention concerns a centrifugal pump or bearing retainer of the invention, wherein the coefficient of thermal expansion for said bearing retainer is larger than for the bearing.

According to an embodiment, the present invention concerns a centrifugal pump or bearing retainer of the invention, wherein said multiple resilient parts allows receiving and supporting the bearing at a first temperature, thereby creating a compression force in radial direction perpendicular to the shaft, and wherein said multiple resilient parts allows maintaining a compression force in radial direction perpendicular to the shaft at a temperature higher than said first temperature.

This provides a bearing retainer allowing operating a multistage fuel pump at high temperatures, while maintaining contact between the bearing retainer and the bearing.

According to an embodiment, the present invention concerns a centrifugal pump or bearing retainer of the invention, wherein said multiple resilient parts are adapted to allow said bearing retainer to remain in contact with the bearing when the temperature changes.

Thereby co-rotation of the bearing with the shaft may be prevented. A bearing retainer of the invention may be manufactured and installed in a pump at room temperature, and still fulfill its role to fixate the bearing at an elevated temperature.

The multiple resilient parts are adapted to allow said bearing retainer to remain in contact with the bearing when the temperature changes due to the choice of dimensions, shape and materials and thus elasticity and resilience.

According to an embodiment, the present invention concerns a centrifugal pump or bearing retainer of the invention, wherein said multiple resilient parts are adapted to allow said bearing retainer to remain in contact with the bearing at a temperature of about 350° C.

According to an embodiment, the present invention concerns a centrifugal pump or bearing retainer of the invention, wherein said multiple resilient parts are adapted to allow said bearing retainer to remain in contact with the bearing in the temperature interval from room temperature up to at least 350° C., preferably at least 400° C., more preferred at least 450° C., preferably at least 500° C., more preferred at least 550° C., preferably at least 600° C., more preferred at least 650° C., preferably at least 700° C., more preferred at least 750° C., preferably at least 800° C., more preferred at least 850° C.

According to an embodiment, the present invention concerns a centrifugal pump or bearing retainer of the invention, wherein said multiple resilient parts are adapted to allow said bearing retainer to remain in contact with the bearing at a temperature of at least 350° C., preferably at least 400° C., more preferred at least 450° C., preferably at least 500° C., more preferred at least 550° C., preferably at least 600° C., more preferred at least 650° C., preferably at least 700° C., more preferred at least 750° C., preferably at least 800° C., more preferred at least 850° C.

According to an embodiment, the present invention concerns a centrifugal pump or bearing retainer of the invention, said bearing retainer further comprising: an additional ring section adjacent said elastic section, such that said elastic section is positioned between said ring section and said additional ring section.

According to an embodiment, the present invention concerns a centrifugal pump or bearing retainer of the invention, said bearing retainer further comprising: an additional elastic section adjacent said ring section, such that said ring section is positioned between said elastic section and said additional elastic section.

According to an embodiment, the present invention concerns a centrifugal pump or bearing retainer of the invention, wherein said bearing retainer has a first end and a second end opposite said first end in an axial direction, and further has a center positioned in the middle between said first end and said second end.

According to an embodiment, the present invention concerns a centrifugal pump or bearing retainer of the invention, wherein said bearing retainer has a first end and a second end opposite said first end in an axial direction, and further has a center positioned in the middle between said first end and said second end, and wherein said bearing retainer has a smaller external diameter at said center of said bearing retainer than the external diameter at said ends of said bearing retainer.

The diameter is here measured in a direction perpendicular to the shaft of the pump. While the term "diameter" is used, it does not necessarily imply that the bearing retainer is circular or cylindrical. The term "diameter" is used to refer to the distance from one side of the bearing retainer, across the axis of rotation of the shaft of the pump, to the opposite side of the bearing retainer.

According to an embodiment, the present invention concerns a centrifugal pump or bearing retainer of the invention, wherein said bearing retainer has a first end and a second end opposite said first end in an axial direction, and further has a center positioned in the middle between said first end and said second end, and wherein said bearing retainer has a larger external diameter at said center of said bearing retainer than the external diameter at said ends of said bearing retainer.

According to an embodiment, the present invention concerns a centrifugal pump or bearing retainer of the invention, wherein said bearing retainer has a first end and a second end opposite said first end in an axial direction, and wherein said bearing retainer has a smaller external diameter at one end of said bearing retainer than the external diameter at the other end of said bearing retainer.

According to an embodiment, the present invention concerns a centrifugal pump or bearing retainer of the invention, wherein said bearing retainer has a first end and a second end opposite said first end in an axial direction, and wherein said bearing retainer further comprises a sealing surface at one of said ends, said sealing surface impeding fluid from passing between said bearing retainer and the bearing.

According to an embodiment, the present invention concerns a centrifugal pump or bearing retainer of the invention, wherein said bearing retainer comprises a number of slits selected among 2, 3, 4, 5, 6, 7, 8, 9, 10, 11, 12, 13, 14, 15, 16, 17, 18, 19 and 20 slits.

According to an embodiment, the present invention concerns a centrifugal pump or bearing retainer of the invention, wherein said bearing retainer has a first end and a second end opposite said first end in an axial direction, wherein said multiple slits do not extend to said ends of said bearing retainer.

In this embodiment the multiple slits protrude the wall of the bearing retainer, such that said slits are surrounded by said wall.

According to an embodiment, the present invention concerns a centrifugal pump or bearing retainer of the invention, wherein said bearing retainer has a first end and a second end opposite said first end in an axial direction, wherein said multiple slits extend to said ends of said bearing retainer.

According to an embodiment, the present invention concerns a centrifugal pump or bearing retainer of the invention, wherein said multiple slits are elongated.

According to an embodiment, the present invention concerns a centrifugal pump or bearing retainer of the invention, wherein said multiple slits have a length to wide ratio of at least 2:1, more preferred at least 3:1, preferably at least 4:1, more preferred at least 5:1, preferably at least 6:1, more preferred at least 7:1, preferably at least 8:1, more preferred at least 9:1, preferably at least 10:1, more preferred at least 11:1, preferably at least 12:1, more preferred at least 15:1.

According to an embodiment, the present invention concerns a centrifugal pump or bearing retainer of the invention, wherein said multiple slits extend into said ring section.

According to an embodiment, the present invention concerns a centrifugal pump or bearing retainer of the invention, wherein said multiple slits extend over at least 30%, preferably at least 40%, more preferred at least 50%, preferably at least 60%, more preferred at least 70%, preferably at least 80%, more preferred at least 90% of the length of the bearing retainer as measured in a direction along the axis of the shaft.

The multiple slits may be slanted with respect to the shaft of the pump. The length of extension of said multiple slits may be measured from one end of a slit to the other end of the slit in a direction along the shaft of the pump.

According to an embodiment, the present invention concerns a centrifugal pump or bearing retainer, wherein said elastic section (4) comprises an oblique subsection adjacent said ring section (2), wherein said oblique subsection comprises a wall which is slanted with respect to the shaft of the pump, and wherein said multiple slits (6) extend into said oblique subsection. This embodiment provides improved resilience or elasticity of the multiple resilient parts.

According to an embodiment, the present invention concerns a centrifugal pump or bearing retainer of the invention, wherein said bearing retainer comprises or consists of metal.

Preferably the bearing retainer comprises or consists of stainless steel.

According to an embodiment, the present invention concerns a centrifugal pump or bearing retainer of the invention, said bearing retainer being adapted to being inserted into a holder of said bearing retainer.

In this embodiment the bearing retainer may act as a spacer between the holder and the bearing.

According to an embodiment, the present invention concerns a centrifugal pump or bearing retainer of the invention, wherein said ring section of said bearing retainer comprises an aperture, facilitating insertion into a holder of said bearing retainer.

According to an embodiment, the present invention concerns a bearing connected to a bearing retainer according to the invention.

According to an embodiment, the present invention concerns a bearing of the invention, wherein said bearing comprises or consists of ceramics.

According to an embodiment, the present invention concerns a combination of a bearing retainer with a bearing, wherein said combination is obtainable by inserting or pressing a bearing into a bearing retainer according to the invention.

According to an embodiment, the present invention concerns a centrifugal pump comprising a bearing retainer according to the invention, a bearing according to the invention, or a combination of a bearing retainer with a bearing according to the invention.

According to an embodiment, the present invention concerns a use of a bearing retainer according to the invention, a bearing according to the invention, or a combination of a bearing retainer with a bearing according to the invention, for supporting a bearing stabilizing the shaft of a centrifugal pump.

FIGURES

Aspects and embodiments of the present invention are described below, in a short description followed by a detailed description of the Figures.

FIG. 13 is rotated 180° with respect to FIG. 1.

DETAILED DISCLOSURE

A more detailed description of the Figures follows below.

Figure 1:
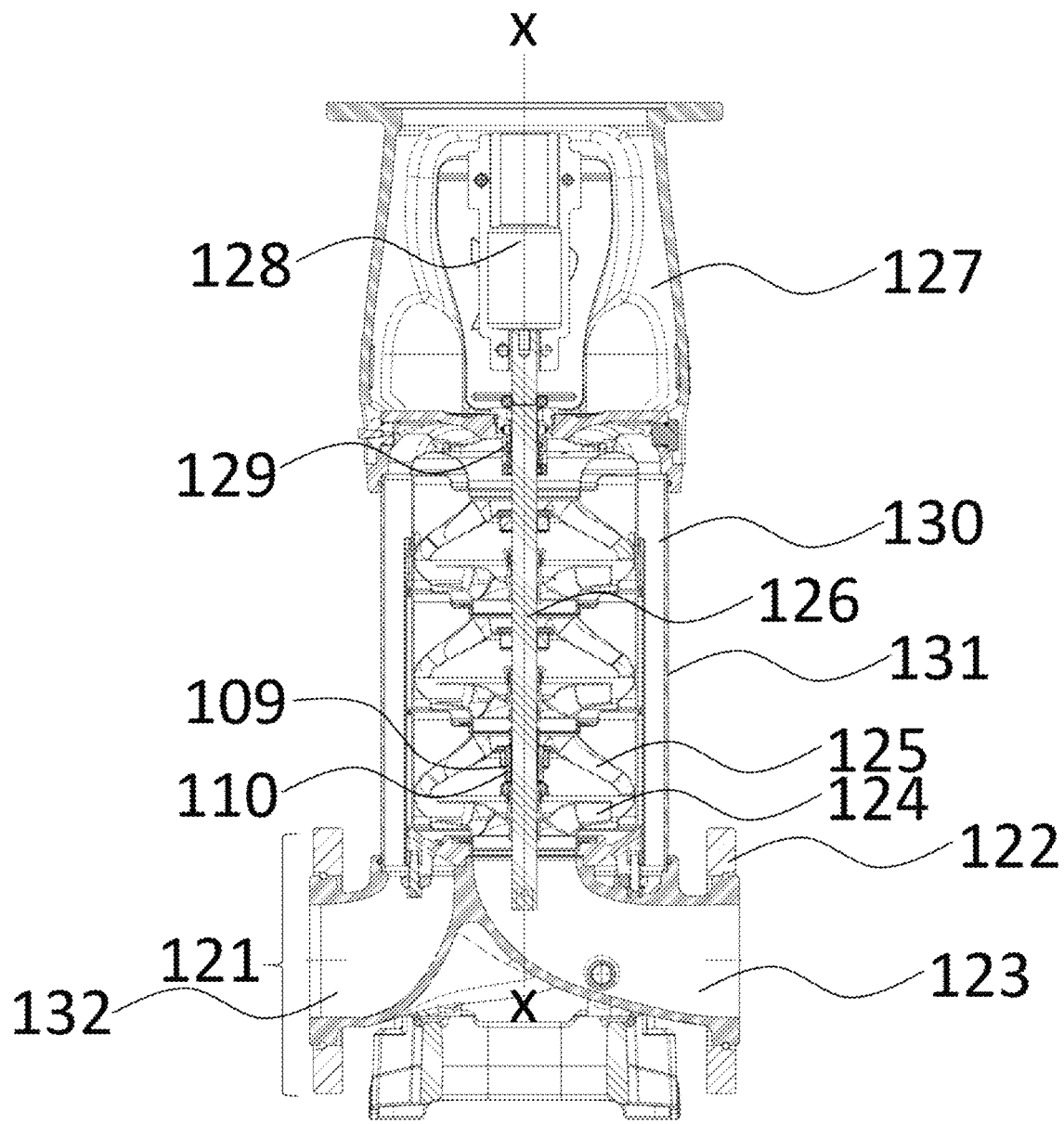
FIG. 1 shows a schematic longitudinal cross section of a centrifugal pump according to an embodiment of the invention.

FIG. 1 shows a schematic longitudinal sectional view through a centrifugal pump according to an embodiment of the invention. The centrifugal pump comprises a bottom part having a pump foot (121) on which the pump is supported, a flange (122) which surrounds a suction branch consisting of an inlet (123) for suction and an outlet (132) for creating pressure. The centrifugal pump has a shaft (126) and a bearing (109) for supporting the shaft and a bearing retainer (110) which supports the bearing. The axis of rotation of the shaft, i.e. the axis of the shaft, is indicated with a line (x-x). The centrifugal pump has a first pump stage consisting of an impeller (124) and a stage guide (125) and the centrifugal pump consists in total of three impellers and three stage guides arranged vertically over one another. The centrifugal pump further has a channel for liquid (130) and an outer stainless steel tube (131). The centrifugal pump comprises a top part consisting of a motorchair (127), a coupling-rotator (128) and a shaft seal (129). The centrifugal pump further comprises a motor (not shown) for rotating the shaft (126).

Figure 2:
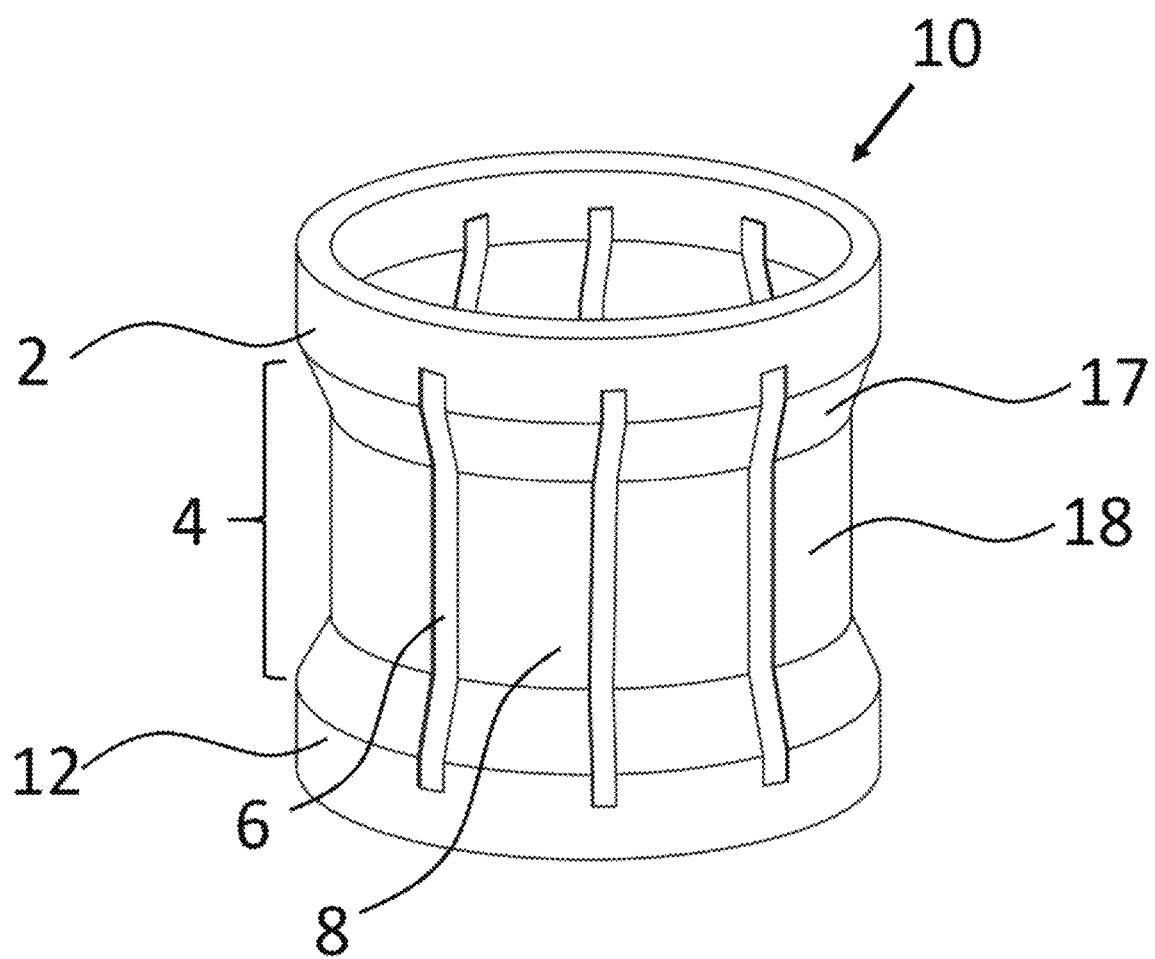
FIG. 2 is a schematic perspective representation of a bearing retainer according to an embodiment of the invention.

FIG. 2 is a schematic perspective representation of a bearing retainer (10) according to an embodiment of the invention for a bearing for supporting the shaft of a pump. The bearing retainer has a ring section (2) adapted to surround the bearing, wherein the ring section has an inner radius perpendicular to the axis of the shaft. The bearing retainer has one elastic section (4) adjacent the ring section, wherein at least a part of the elastic section has an inner radius perpendicular to the axis of the shaft, which inner radius is smaller than the radius of the ring section. The bearing retainer has a ring section (12) adjacent the elastic section (4). The elastic section comprises multiple slits (6) which are parallel to the axis of the shaft (not shown). The slits divide the elastic section into multiple resilient parts (8). The multiple resilient parts are adapted to receive and support the bearing and creates a compression force in radial direction perpendicular to the axis of the shaft. This allows the bearing retainer to hold the bearing in a fixed position with respect to the bearing retainer. The elastic section comprises an oblique subsection (17) adjacent the ring section, which has a wall, which is slanted with respect to the shaft of the pump. The bearing retainer further comprises a cylindrical subsection (18) adjacent the oblique subsection, which has a wall, which is parallel to the shaft of the pump.

Figure 3:
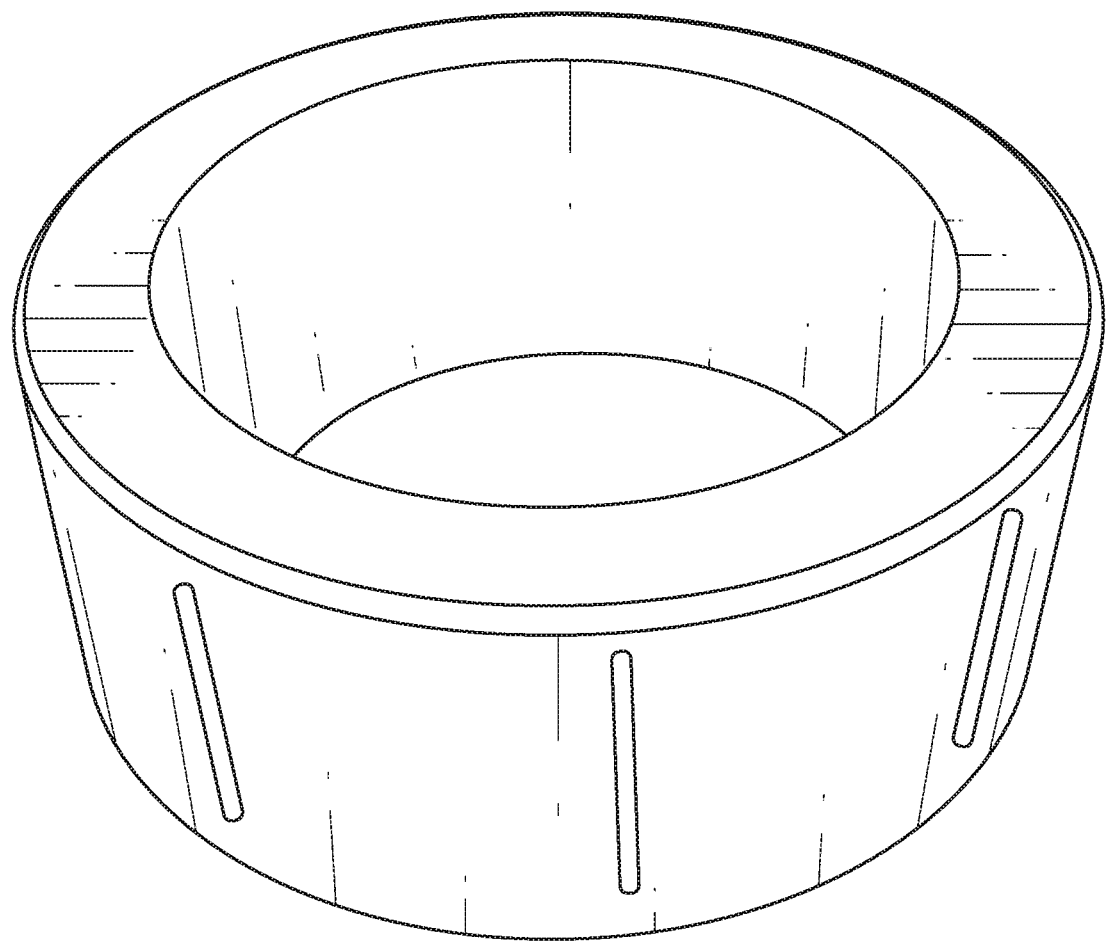
FIG. 3 is a schematic representation of a bearing inside a bearing retainer according to an embodiment of the invention.

FIG. 3 is a schematic representation of a bearing inside a bearing retainer according to an embodiment of the invention. The bearing is the non-rotating part of the full bearing. The other part, the rotating part, is mounted on a shaft. Both bearing parts are made of a ceramic material.

Figure 4:
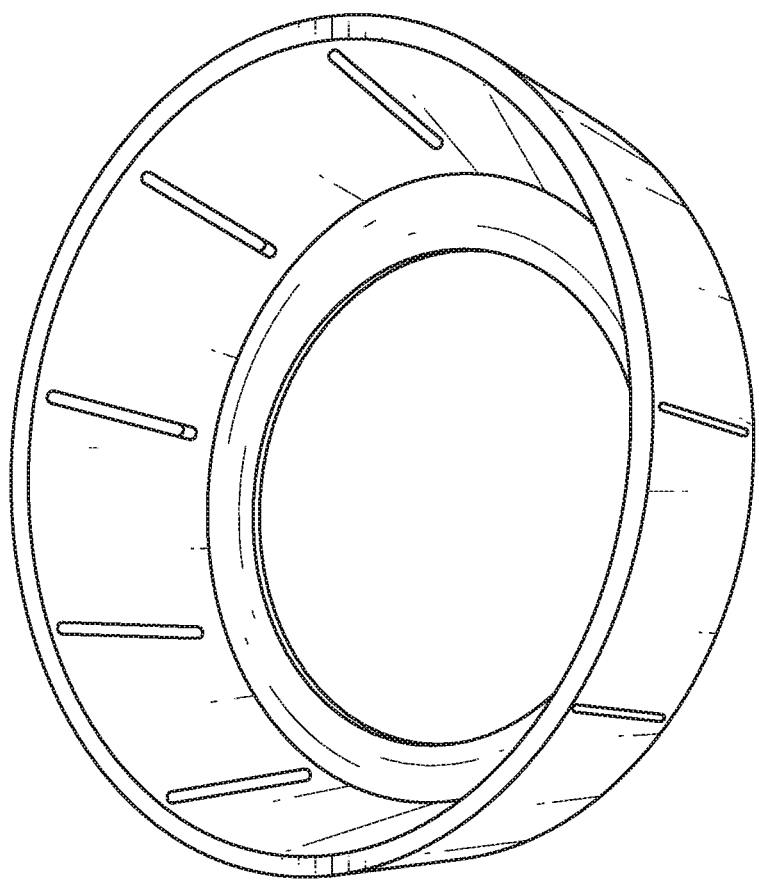
FIG. 4 is a schematic representation of a bearing (left in the picture) and a bearing retainer (right in the picture) according to an embodiment of the invention.
Figure 4:
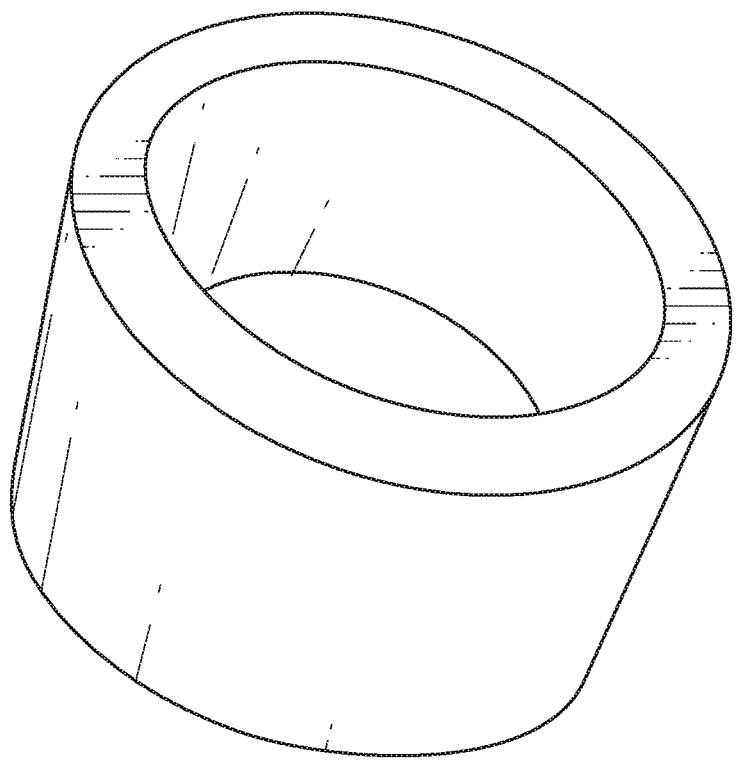

FIG. 4 is a schematic representation of a bearing (left in the picture) and a bearing retainer (right in the picture) according to an embodiment of the invention.

Figure 5:
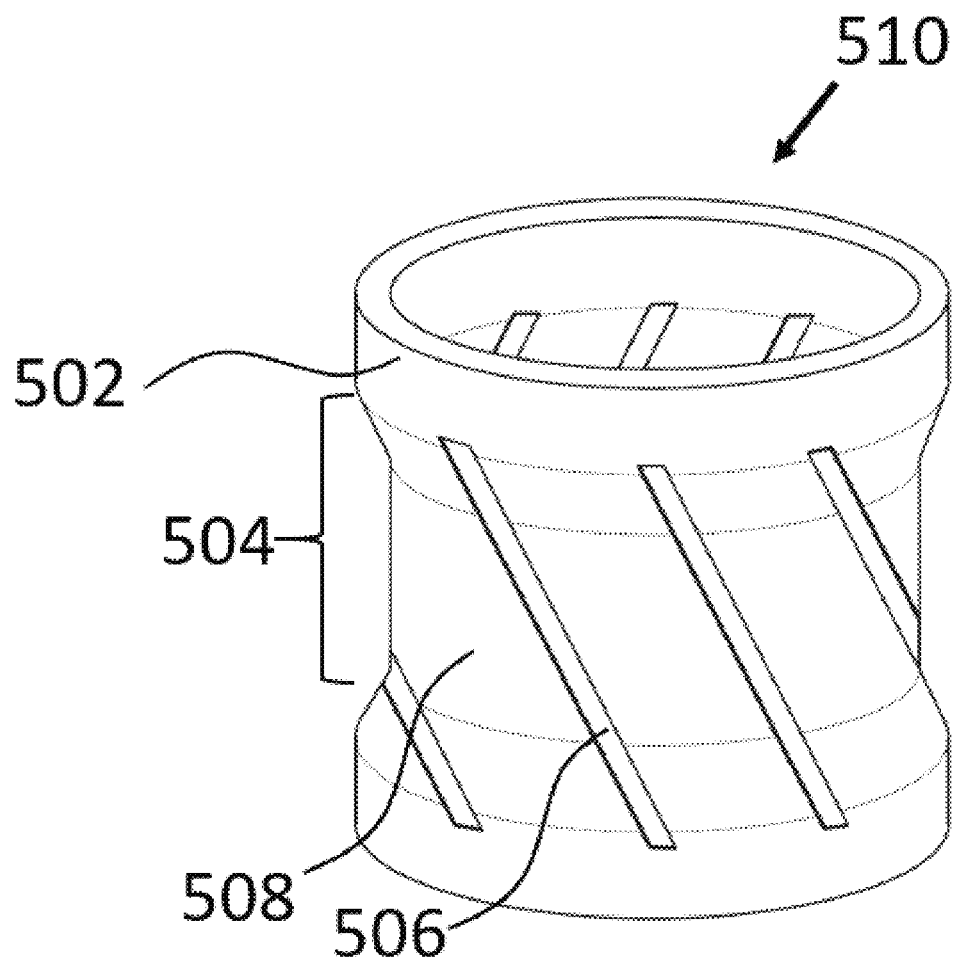
FIG. 5 is a schematic perspective representation of a bearing retainer according to an embodiment of the invention, wherein the slits are oblique.

FIG. 5 is a schematic perspective representation of a bearing retainer (510) according to an embodiment of the invention for a bearing for supporting the shaft of a pump. The bearing retainer has a ring section (502) adapted to surround the bearing, wherein the ring section has an inner radius perpendicular to the axis of the shaft. The bearing retainer has one elastic section (504) adjacent the ring section, wherein at least a part of the elastic section has an inner radius perpendicular to the axis of the shaft, which inner radius is smaller than the radius of the ring section. The elastic section comprises multiple oblique slits (506) which divides the elastic section into multiple resilient parts (508). The multiple resilient parts are adapted to receive and support the bearing and creates a compression force in radial direction perpendicular to the axis of the shaft. This allows the bearing retainer to hold the bearing in a fixed position with respect to the bearing retainer. The elastic section comprises an oblique subsection adjacent the ring section, which has a wall, which is slanted with respect to the shaft of the pump. The bearing retainer further comprises a cylindrical subsection adjacent the oblique subsection, which has a wall, which is parallel to the shaft of the pump.

Figure 6:
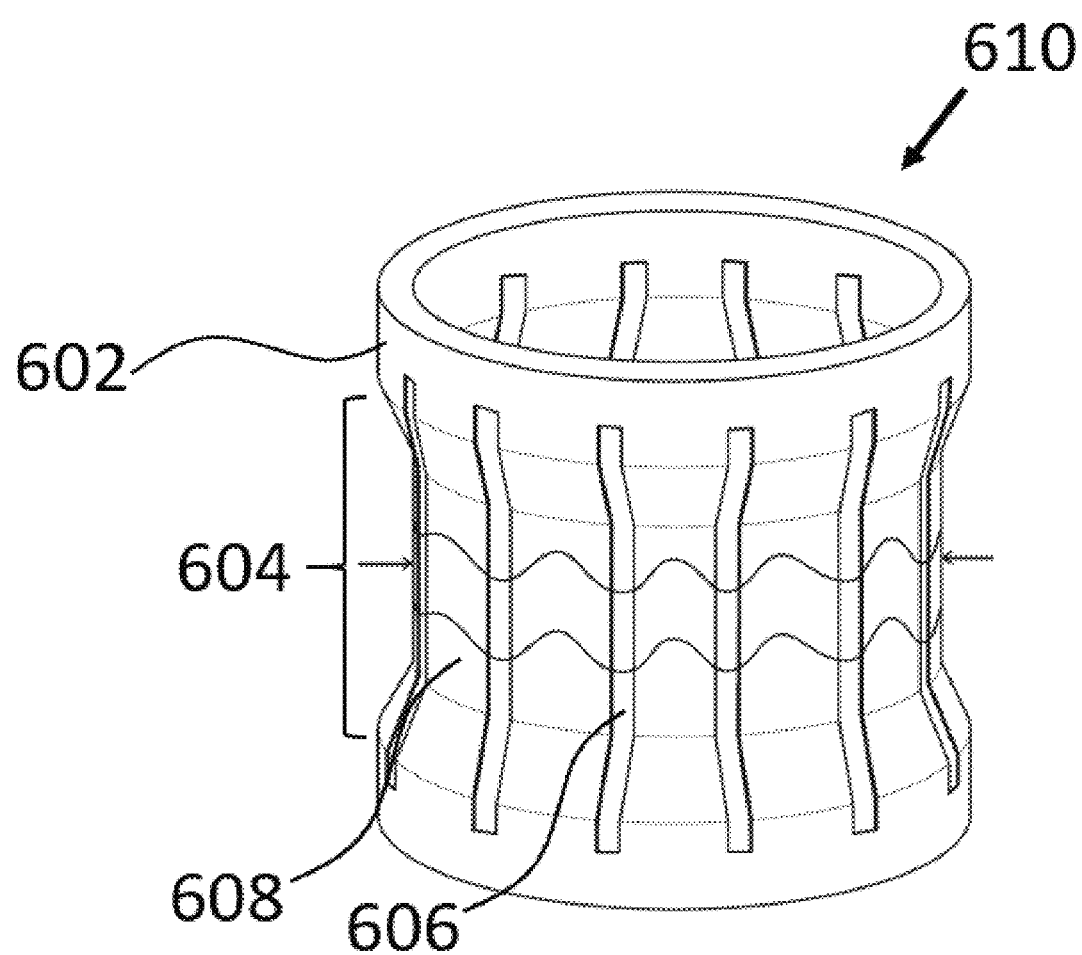
FIG. 6 is a schematic perspective representation of a bearing retainer according to an embodiment of the invention, wherein the elastic section comprises a part having a wave shaped form.

FIG. 6 is a schematic perspective representation of a bearing retainer (610) according to an embodiment of the invention for a bearing for supporting the shaft of a pump. The bearing retainer has one ring section (602) adapted to surround the bearing, wherein the ring section has an inner radius perpendicular to the axis of the shaft. The bearing retainer has one elastic section (604) adjacent the ring section, wherein at least a part of the elastic section has an inner radius perpendicular to the axis of the shaft, which inner radius is smaller than the radius of the ring section. The elastic section comprises a part having a wave shaped form. This wave shaped form provides a number of supporting points of contact to a bearing (not shown). The elastic section comprises multiple slits (606) which are parallel to the axis of the shaft (not shown). The slits divide the elastic section into multiple resilient parts (608). The multiple resilient parts are adapted to receive and support the bearing and creates a compression force in radial direction perpendicular to the axis of the shaft. This allows the bearing retainer to hold the bearing in a fixed position with respect to the bearing retainer. The elastic section comprises an oblique subsection adjacent the ring section, which has a wall which is slanted with respect to the shaft of the pump.

Figure 7:
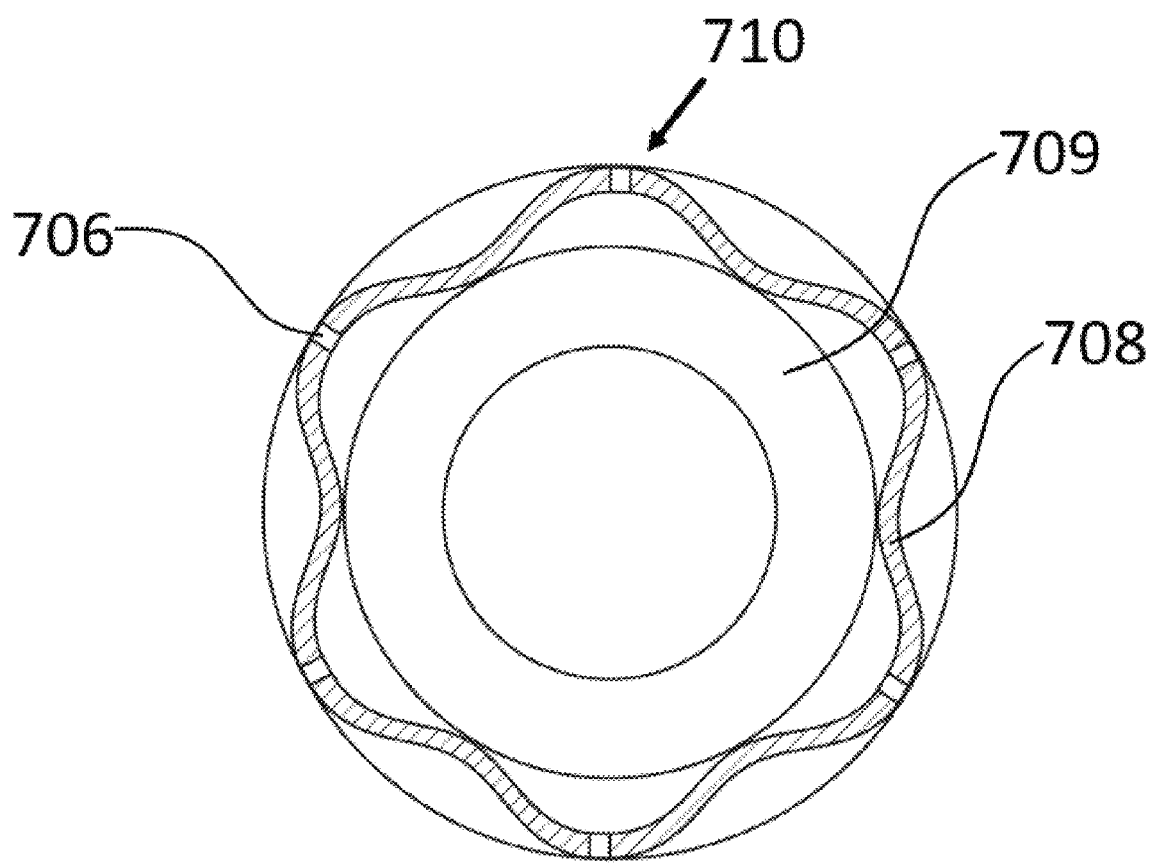
FIG. 7 shows a schematic top view of a cross section of a bearing retainer according to an embodiment of the invention.

FIG. 7 is a schematic top view of a cross section through the middle of a bearing retainer (710) according to an embodiment of the invention. The bearing retainer holds a bearing (709) for supporting the shaft of a pump. Visible features include multiple slits (706) in the elastic section which divides the elastic section into multiple resilient parts (708). The elastic section comprises a part having a wave shaped form. This wave shaped form provides a number of supporting points of contact to the bearing. The multiple resilient parts are adapted to receive and support the bearing and create a compression force in radial direction perpendicular to the axis of the shaft. This allows the bearing retainer to hold the bearing in a fixed position with respect to the bearing retainer.

Figure 8:
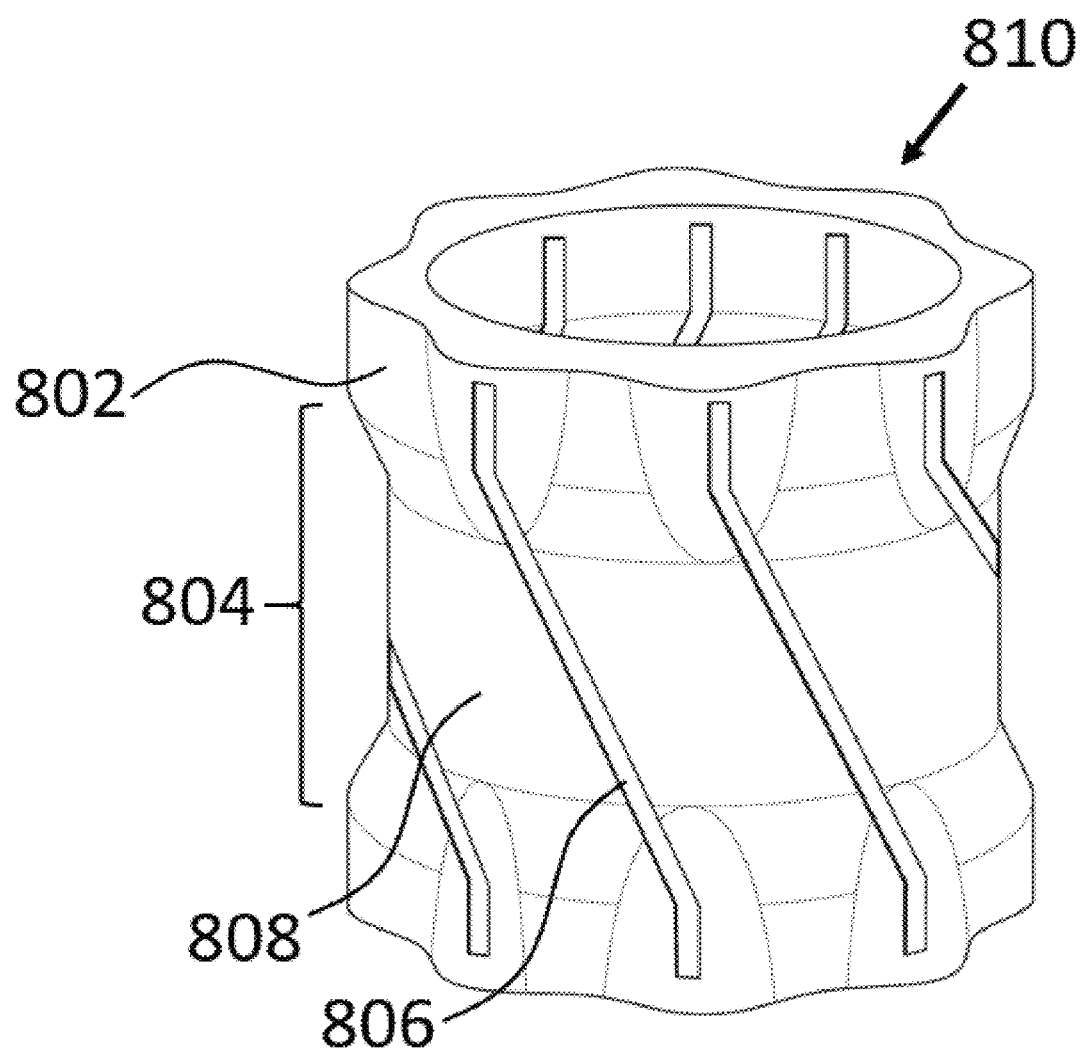
FIG. 8 is a schematic perspective representation of a bearing retainer according to an embodiment of the invention, wherein the slits are linear with a bend in each end.

FIG. 8 is a schematic perspective representation of a bearing retainer (810) according to an embodiment of the invention for a bearing for supporting the shaft of a pump. The bearing retainer has one ring section (802) adapted to surround the bearing, wherein the ring section has an inner radius perpendicular to the axis of the shaft. The ring section (802) has a variable thickness in the circumferential direction. The ring section (802) has an outer profile that is wave formed and an inner radius that is constant. The bearing retainer has one elastic section (804) adjacent the ring section, wherein at least a part of the elastic section has an inner radius perpendicular to the axis of the shaft, which inner radius is smaller than the radius of the ring section. The elastic section comprises multiple slits (806) which are linear with a bend in each end. The slits (806) divides the elastic section into multiple resilient parts (808). The multiple resilient parts are adapted to receive and support the bearing and creates a compression force in radial direction perpendicular to the axis of the shaft. This allows the bearing retainer to hold the bearing in a fixed position with respect to the bearing retainer.

Figure 9:
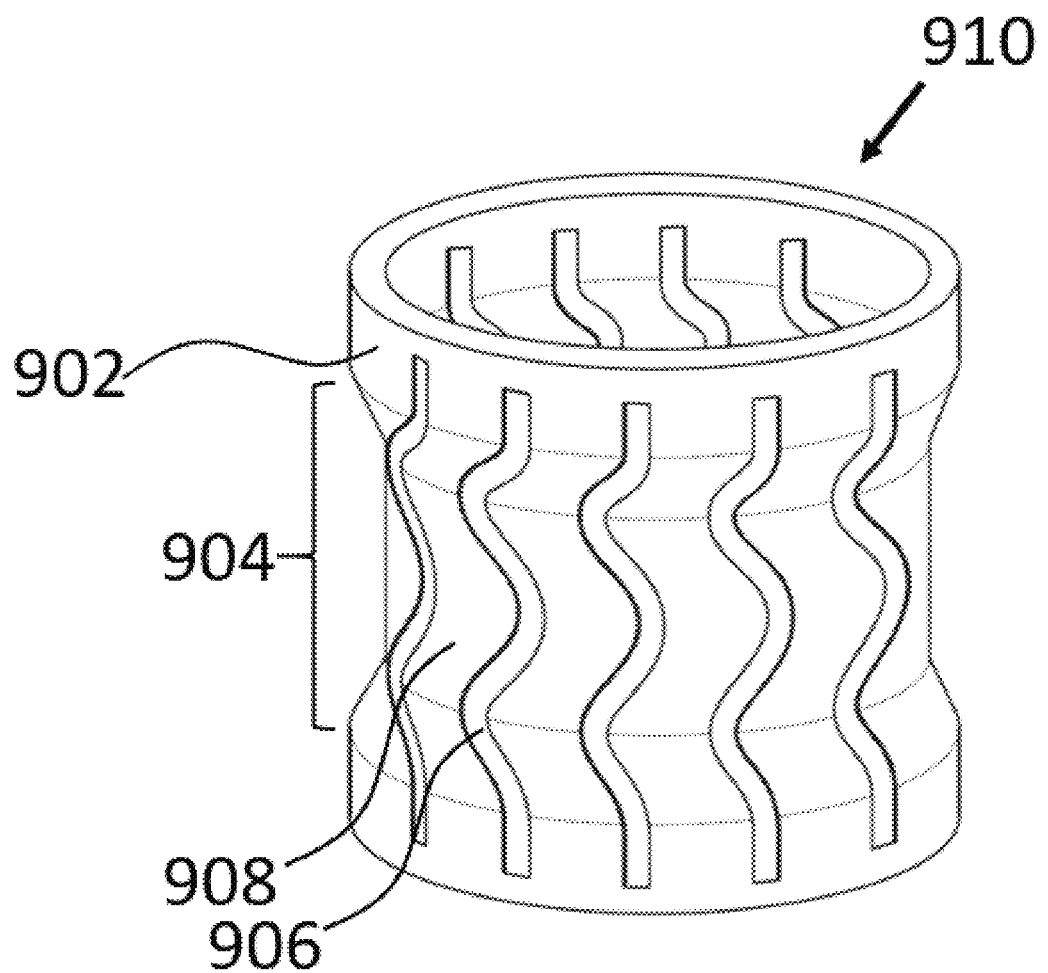
FIG. 9 is a schematic perspective representation of a bearing retainer according to an embodiment of the invention, wherein the slits are shaped like a wave.

FIG. 9 is a schematic perspective representation of a bearing retainer (910) according to an embodiment of the invention for a bearing for supporting the shaft of a pump. The bearing retainer has one ring section (902) adapted to surround the bearing, wherein the ring section has an inner radius perpendicular to the axis of the shaft. The bearing retainer has one elastic section (904) adjacent the ring section, wherein at least a part of the elastic section has an inner radius perpendicular to the axis of the shaft, which inner radius is smaller than the radius of the ring section. The elastic section comprises multiple slits (906) which are shaped as a wave. The slits (906) divide the elastic section into multiple resilient parts (908). The multiple resilient parts are adapted to receive and support the bearing and creates a compression force in radial direction perpendicular to the axis of the shaft. This allows the bearing retainer to hold the bearing in a fixed position with respect to the bearing retainer. The elastic section comprises an oblique subsection adjacent the ring section, which has a wall, which is slanted with respect to the shaft of the pump. The bearing retainer further comprises a cylindrical subsection adjacent the oblique subsection, which has a wall, which is parallel to the shaft of the pump.

Figure 10:
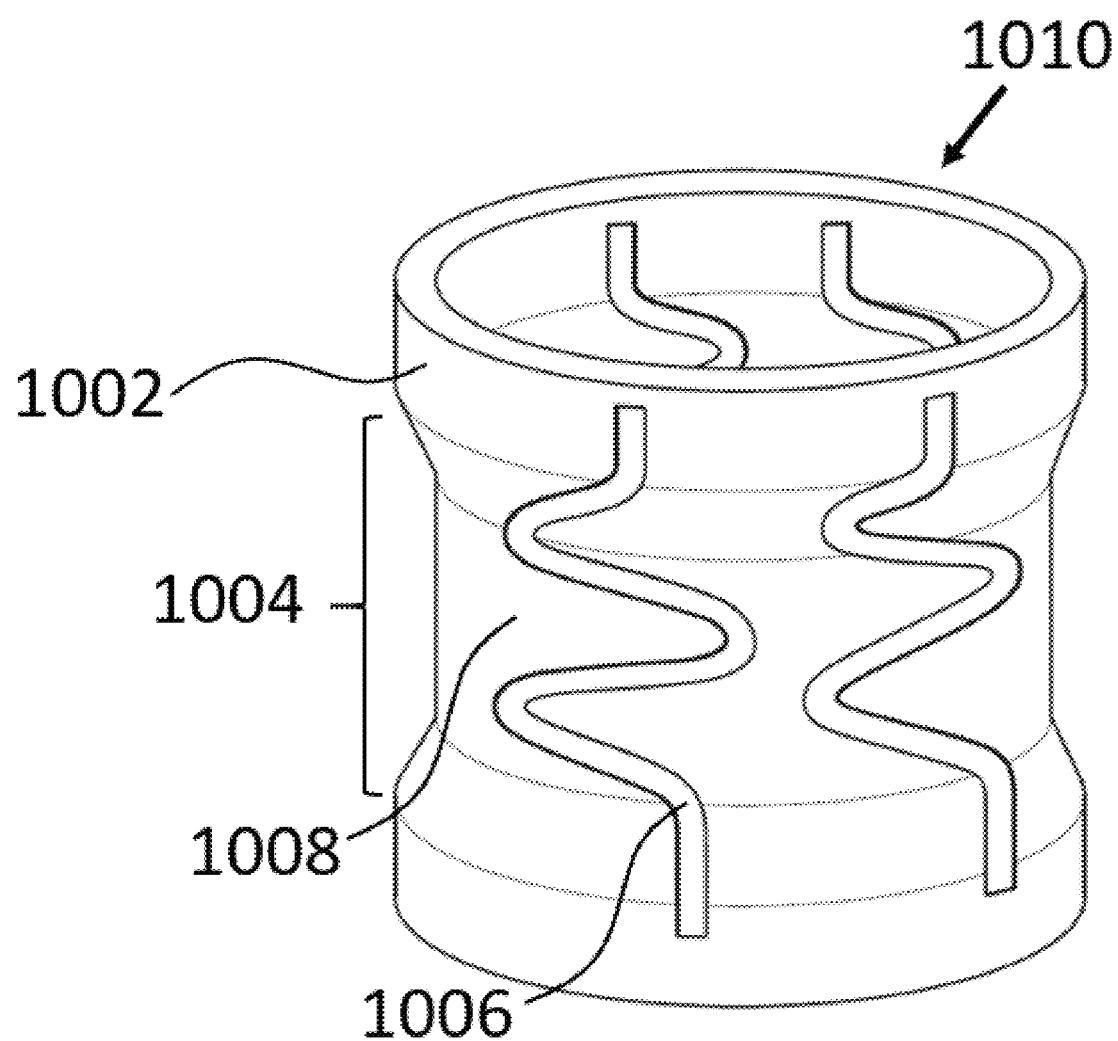
FIG. 10 is a schematic perspective representation of a bearing retainer according to an embodiment of the invention, wherein the slits are shaped like a wave.

FIG. 10 is a schematic perspective representation of a bearing retainer (1010) according to an embodiment of the invention for a bearing for supporting the shaft of a pump. The bearing retainer has one ring section (1002) adapted to surround the bearing, wherein the ring section has an inner radius perpendicular to the axis of the shaft. The bearing retainer has one elastic section (1004) adjacent the ring section, wherein at least a part of the elastic section has an inner radius perpendicular to the axis of the shaft, which inner radius is smaller than the radius of the ring section. The elastic section comprises multiple slits (1006) which are shaped like a wave. The slits (1006) divide the elastic section into multiple resilient parts (1008). The multiple resilient parts are adapted to receive and support the bearing and creates a compression force in radial direction perpendicular to the axis of the shaft. This allows the bearing retainer to hold the bearing in a fixed position with respect to the bearing retainer. The elastic section comprises an oblique subsection adjacent the ring section, which has a wall, which is slanted with respect to the shaft of the pump.

The bearing retainer further comprises a cylindrical subsection adjacent the oblique subsection, which has a wall, which is parallel to the shaft of the pump.

Figure 11:
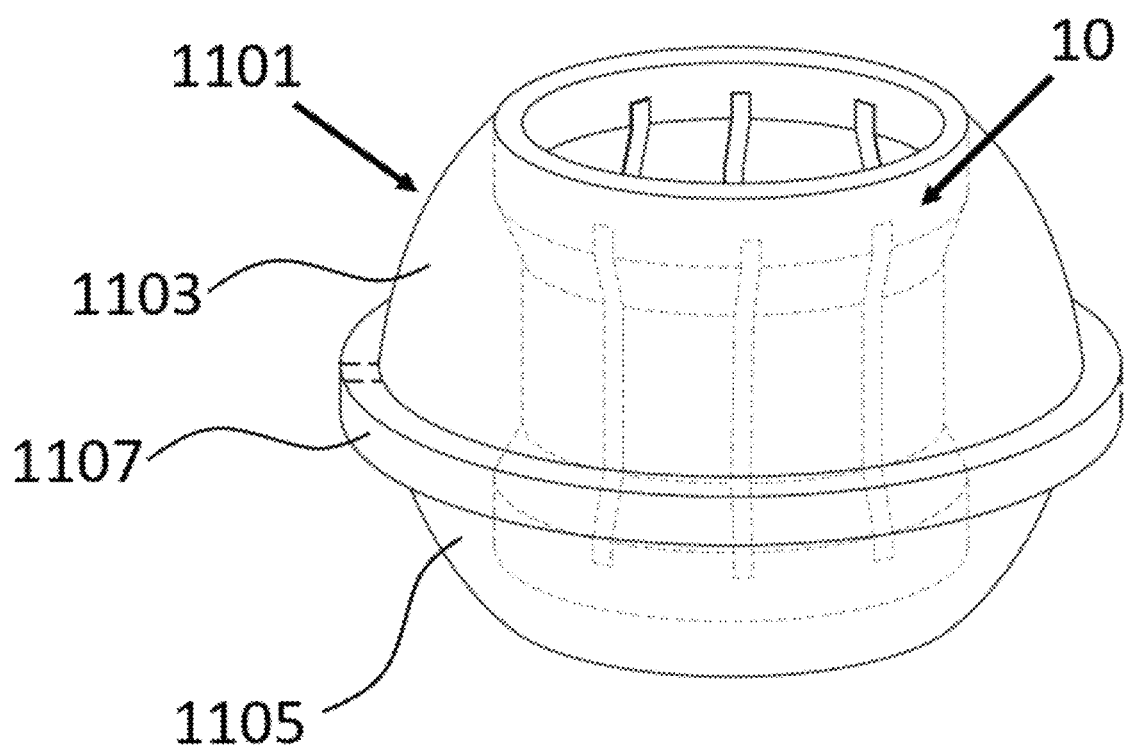
FIG. 11 is a schematic perspective representation of a bearing retainer according to an embodiment of the invention in a holder.

FIG. 11 is a schematic perspective representation of a bearing retainer (10) according to an embodiment of the invention for a bearing for supporting the shaft of a pump. The bearing retainer is placed in a holder (1101). The holder has an upper part (1103), a lower part (1105) and a connecting belt (1107) which connect the upper and lower part of the holder. The bearing retainer can act as a spacer between the holder and the bearing.

Figure 12:
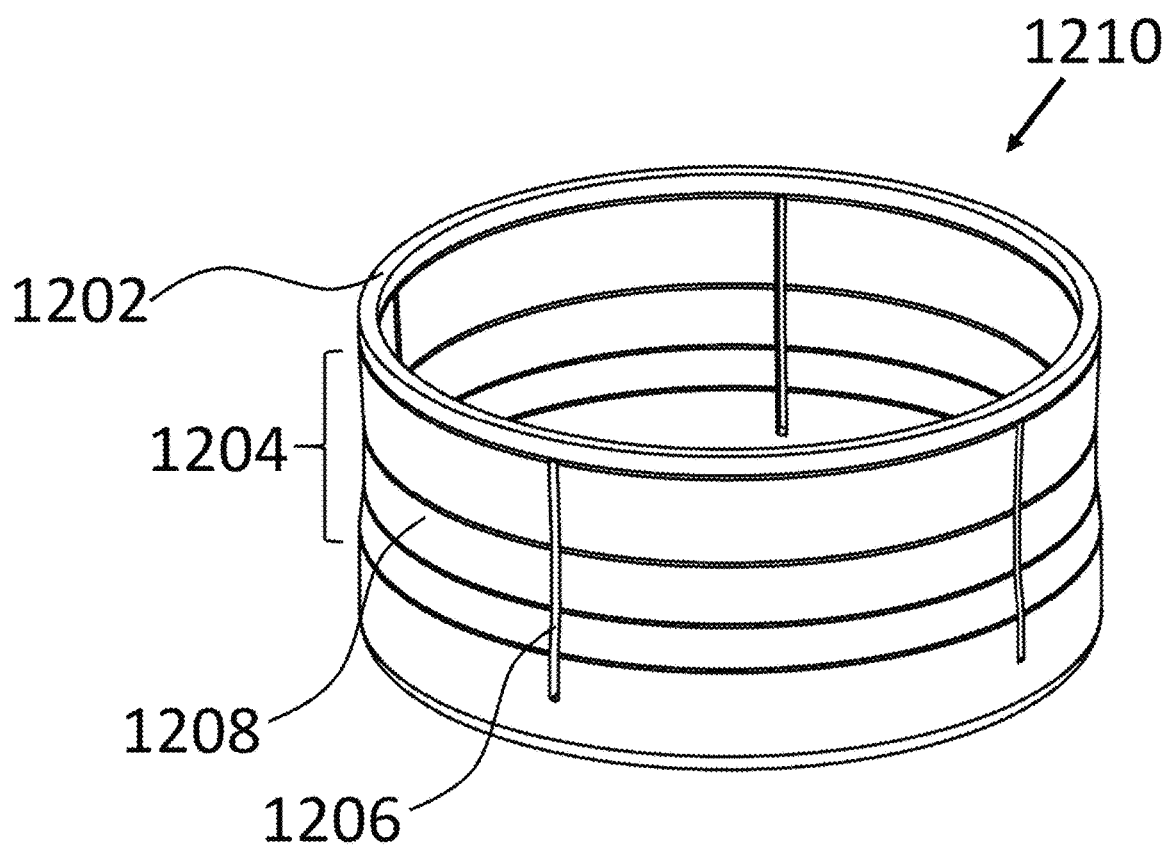
FIG. 12 is a schematic perspective representation of a bearing retainer according to an embodiment of the invention, wherein the bearing retainer has multiple slits extending to the ring sections of the bearing retainer.

FIG. 12 is a schematic perspective representation of a bearing retainer (1210) according to an embodiment of the invention for a bearing for supporting the shaft of a pump. The bearing retainer has one ring section (1202) adapted to surround the bearing, wherein the ring section has an inner radius perpendicular to the axis of the shaft. The bearing retainer has one elastic section (1204) adjacent the ring section, wherein at least a part of the elastic section has an inner radius perpendicular to the axis of the shaft, which inner radius is smaller than the radius of the ring section. The elastic section comprises multiple slits (1206) which divides the elastic section into multiple resilient parts (1208). The multiple resilient parts are adapted to receive and support the bearing and creates a compression force in radial direction perpendicular to the axis of the shaft. This allows the bearing retainer to hold the bearing in a fixed position with respect to the bearing retainer. The bearing retainer has a first end and a second end opposite the first end in an axial direction, wherein the multiple slits (1206) extend to the ring sections of the bearing retainer.

Figure 13:
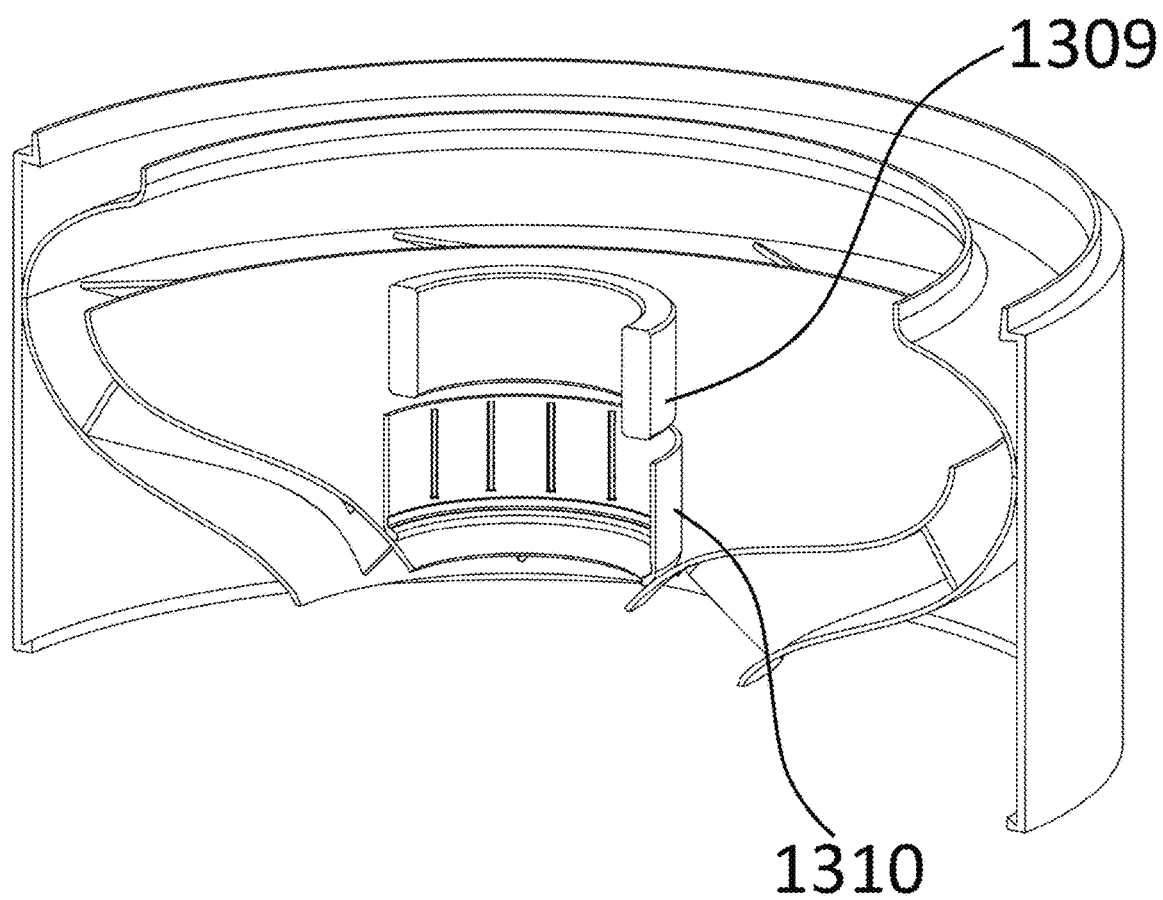
FIG. 13 shows a schematic sectional view through the guiding chamber of a centrifugal pump according to an embodiment of the invention showing an unassembled bearing and a bearing retainer, wherein the bearing may support the shaft of a pump.

FIG. 13 shows a schematic sectional view through the guiding chamber of a centrifugal pump according to an embodiment of the invention showing an unassembled bearing (1309) and a bearing retainer (1310), wherein the bearing (1309) may support the shaft (not shown) of the pump. The bearing retainer is welded to the inner guide cup of a guiding chamber of a centrifugal pump. FIG. 13 is rotated 180° with respect to FIG. 1.

Figure 14:
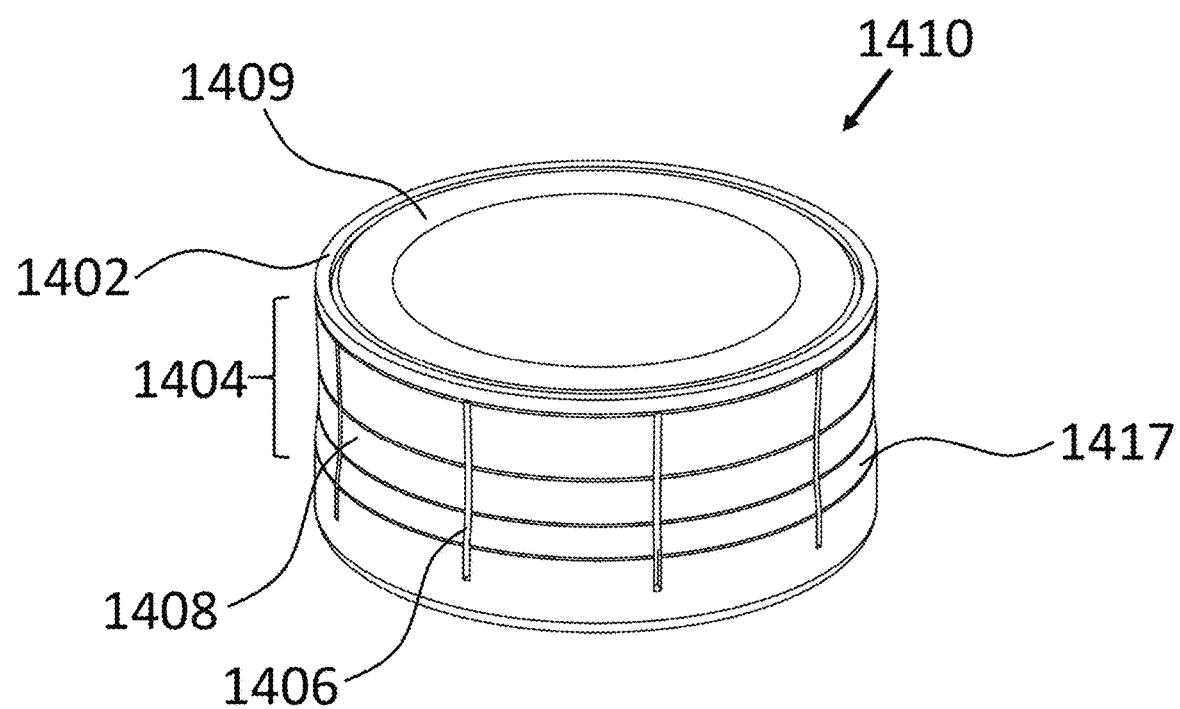
FIG. 14 is a schematic perspective representation of a bearing retainer according to an embodiment of the invention holding a bearing, wherein the bearing retainer has multiple slits extending to the ring sections of the bearing retainer.

FIG. 14 is a schematic perspective representation of a bearing retainer (1410) according to an embodiment of the invention, wherein the bearing retainer holds a bearing (1409) for supporting the shaft of a pump. The bearing retainer has one ring section (1402) adapted to surround the bearing, wherein the ring section has an inner radius perpendicular to the axis of the shaft. The bearing retainer has one elastic section (1404) adjacent the ring section, wherein at least a part of the elastic section has an inner radius perpendicular to the axis of the shaft, which inner radius is smaller than the radius of the ring section. The elastic section comprises multiple slits (1406) which divides the elastic section into multiple resilient parts (1408). The multiple resilient parts are adapted to receive and support the bearing and create a compression force in radial direction perpendicular to the axis of the shaft. This allows the bearing retainer to hold the bearing in a fixed position with respect to the bearing retainer. The elastic section comprises an oblique subsection (1417) adjacent the ring section, which has a wall, which is slanted with respect to the shaft of the pump. The bearing retainer has a first end and a second end opposite the first end in an axial direction, wherein the multiple slits (1406) extend to the ring sections of the bearing retainer.

Figure 15:
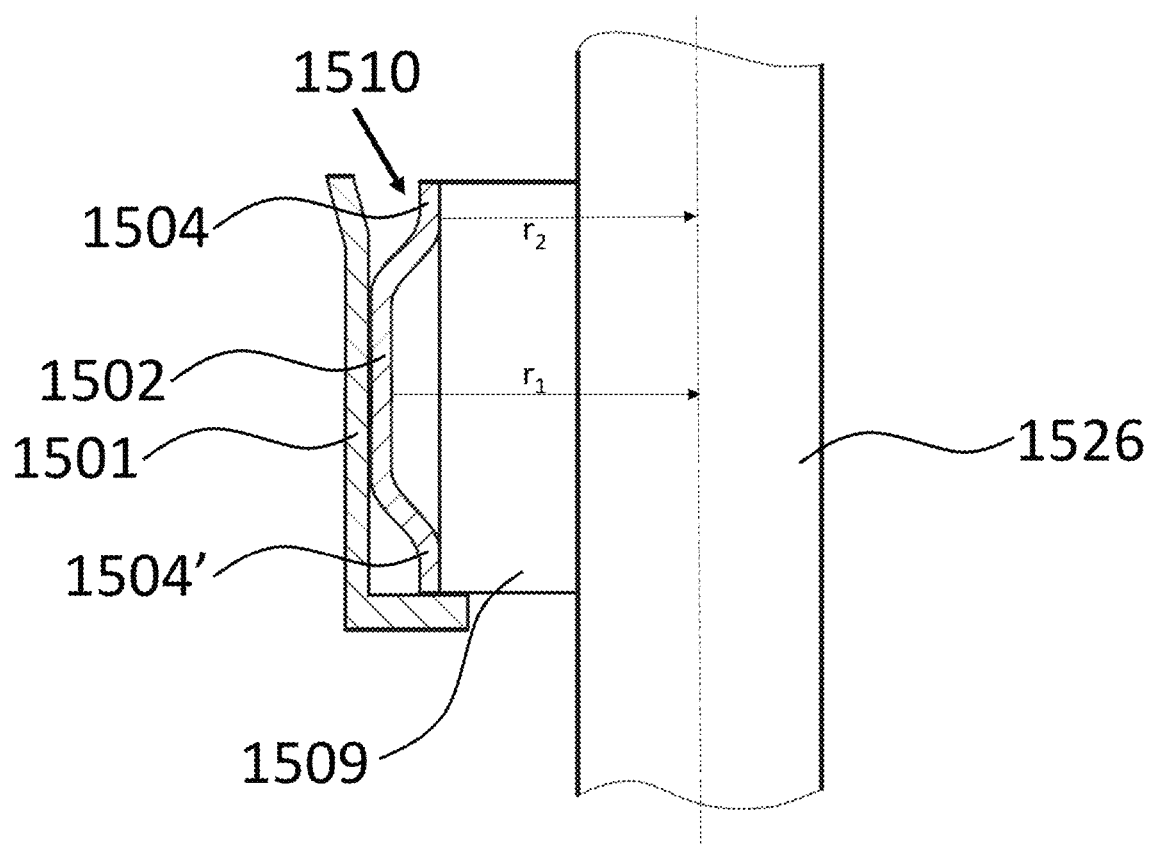
FIG. 15 shows a schematic side view of a cross section of a bearing retainer according to an embodiment of the invention comprising two elastic sections adjacent a ring section. A holder holds the bearing retainer, which holds a bearing, supporting a shaft.

FIG. 15 shows a schematic side view of a cross section of a bearing retainer (1510) according to an embodiment of the invention. A holder (1501) holds the bearing retainer (1510), which holds a bearing (1509) supporting the shaft (1526) of a pump. The bearing retainer has one ring section (1502) adapted to surround the bearing (1509), wherein the ring section has an inner radius ($r_1$) perpendicular to the axis of the shaft. The bearing retainer has two elastic sections (1504, 1504') adjacent the ring section, wherein at least a part of the elastic section has an inner radius ($r_2$) perpendicular to the axis of the shaft, which inner radius is smaller than the radius of the ring section. The elastic section comprises multiple slits (not shown) which divides the elastic section into multiple resilient parts. The multiple resilient parts are adapted to receive and support the bearing and creates a compression force in radial direction perpendicular to the axis of the shaft. This allows the bearing retainer to hold the bearing in a fixed position with respect to the bearing retainer.

Figure 16:
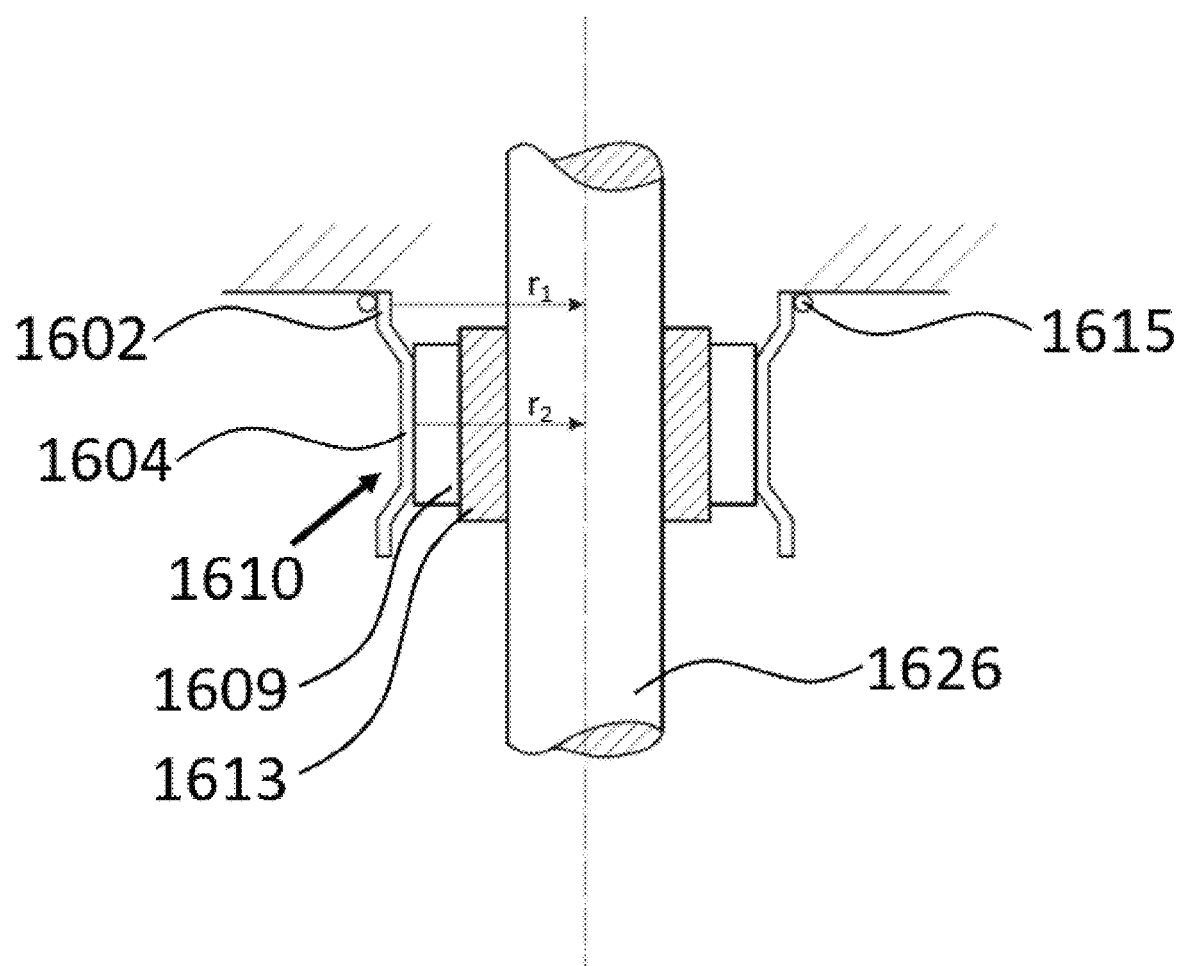
FIG. 16 shows a schematic side view of a cross section of a bearing retainer according to an embodiment of the invention. The bearing retainer holds a bearing and an additional bearing contacts and co-rotates with the shaft of the pump.

FIG. 16 shows a schematic side view of a cross section of a bearing retainer (1610) according to an embodiment of the invention for a bearing (1609) for supporting the shaft (1626) of a pump. There is a second bearing (1613) which contacts and co-rotates with the shaft (1626) of a pump. The bearing retainer has one ring section (1602) adapted to surround the bearing, wherein the ring section has an inner radius ($r_1$) perpendicular to the axis of the shaft. The bearing retainer has an elastic section (1604) adjacent the ring section, wherein at least a part of the elastic section has an inner radius ($r_2$) perpendicular to the axis of the shaft, which inner radius is smaller than the inner radius of the ring section. The elastic section comprises multiple slits (not shown) which divides the elastic section into multiple resilient parts. The multiple resilient parts are adapted to receive and support the bearing and creates a compression force in radial direction perpendicular to the axis of the shaft. This allows the bearing retainer to hold the bearing in a fixed position with respect to the bearing retainer. The circles show a welding seam (1615), which welds the bearing retainer (1602) to the stage guide of the pump. The welding can be a continuous seam, or it can be spot weldings. Other types of mechanical fixation are also possible, though welding is the most common approach.

Figure 17:
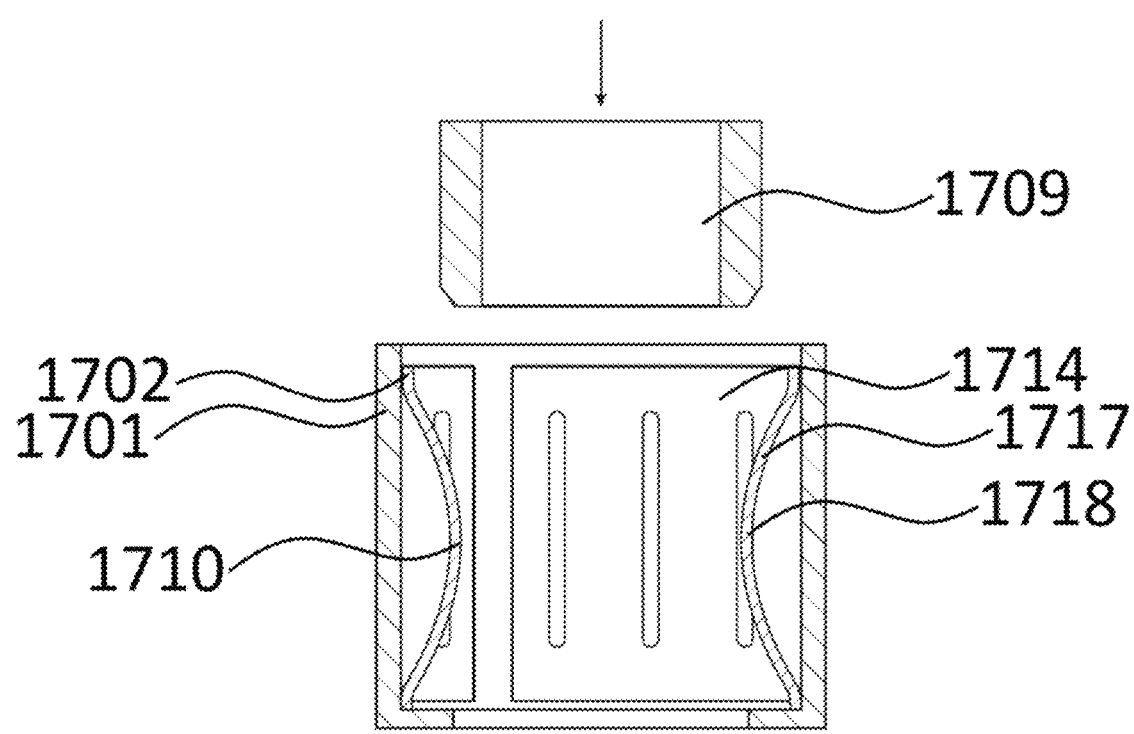
FIG. 17 shows a schematic cross section of a bearing retainer according to an embodiment of the invention. The front part of the bearing retainer has been cut open revealing the inner backside of the bearing retainer.

FIG. 17 shows a schematic cross section of a bearing retainer (1710) according to an embodiment of the invention for a bearing (1709) for supporting the shaft of a pump. The bearing retainer is placed within a holder (1701). The holder has a sealed surface in the bottom, which sealed surface comprises an opening, allowing the shaft to pass through the sealed surface. The front part of the retainer has been cut open to create a squared window, so that the inner backside of the bearing retainer (1714) is visible. The arrow indicates the direction of insertion of the bearing into the bearing retainer. The bearing retainer (1710) has a ring section (1702), and an elastic section adjacent the ring section (1702). The elastic section comprises an oblique subsection (1717), and a cylindrical subsection (1718) adjacent said oblique subsection (1717), wherein said oblique subsection (1717) comprises a wall which is slanted with respect to the shaft of the pump, and said cylindrical subsection (1718) comprises a wall which is parallel to the shaft of the pump. The slanted wall forms a curved slope, connecting the ring section (1702) with the cylindrical subsection (1718).

All cited references are incorporated by reference.

The accompanying Figures are provided to explain rather than limit the present invention. It will be clear to the person skilled in the art that aspects, embodiments and claims of the present invention may be combined.

Unless otherwise mentioned, all measurements are conducted under standard conditions (ambient temperature and pressure).

The invention claimed is:

1. A bearing retainer configured for assembly with a bearing to support a shaft of a pump, said bearing retainer comprising:
    at least one ring section adapted to surround the bearing, said ring section having an inner radius perpendicular to an axis of the shaft, said ring section having a variable thickness in the circumferential direction;
    at least one elastic section adjacent said ring section, wherein at least a part of said elastic section has an inner radius perpendicular to the axis of the shaft, which inner radius is smaller than said radius of said ring section, said elastic section comprising multiple slits, dividing said elastic section into multiple resilient parts;
    said multiple resilient parts being adapted to allowing receiving and supporting the bearing, thereby creating a compression force in radial direction perpendicular to the axis of the shaft, allowing said bearing retainer to hold the bearing in a fixed position with respect to said bearing retainer;
    wherein said elastic section comprises an oblique subsection adjacent said ring section, and a cylindrical subsection adjacent said oblique subsection, wherein said oblique subsection comprises a wall which is slanted with respect to the shaft of the pump, and said cylindrical subsection comprises a wall which is parallel to the shaft of the pump.

2. The bearing retainer according to claim 1, wherein said multiple resilient parts allows receiving and supporting the bearing at a first temperature, thereby creating a compression force in radial direction perpendicular to the shaft, and wherein said multiple resilient parts allows maintaining a compression force in radial direction perpendicular to the shaft at a temperature higher than said first temperature.

3. The bearing retainer according to claim 1, wherein said multiple resilient parts are adapted to allow said bearing retainer to remain in contact with the bearing when the temperature changes.

4. The bearing retainer of claim 1, further comprising:
    an additional ring section adjacent said elastic section, such that said elastic section is positioned between said ring section and said additional ring section.

5. The bearing retainer of claim 1, further comprising:
    an additional elastic section adjacent said ring section, such that said ring section is positioned between said elastic section and said additional elastic section.

6. The bearing retainer according to claim 1, wherein said bearing retainer has a first end and a second end opposite said first end in an axial direction, and further has a center positioned in the middle between said first end and said second end, and wherein said bearing retainer has a smaller external diameter at said center of said bearing retainer than the external diameter at said ends of said bearing retainer.

7. The bearing retainer according to claim 1, wherein said multiple slits have a length to wide ratio of at least 2:1, more preferred at least 3:1, preferably at least 4:1, more preferred at least 5:1, preferably at least 6:1, more preferred at least 7:1, preferably at least 8:1, more preferred at least 9:1, preferably at least 10:1, more preferred at least 11:1, preferably at least 12:1, more preferred at least 15:1.

8. The bearing retainer according to claim 1 wherein said multiple slits extend into said oblique subsection of said elastic section.

9. A bearing retainer configured for assembly with a bearing to support a shaft of a pump, said bearing retainer comprising:
    at least one ring section adapted to surround the bearing, said ring section having an outer profile that is wave formed, said ring section having an inner radius perpendicular to the axis of the shaft wherein said inner radius is constant;
    at least one elastic section adjacent said ring section, wherein at least a part of said elastic section has an inner radius perpendicular to an axis of the shaft, which inner radius is smaller than said radius of said ring section; said elastic section comprising multiple slits, dividing said elastic section into multiple resilient parts;

said multiple resilient parts being adapted to allowing receiving and supporting the bearing, thereby creating a compression force in radial direction perpendicular to the axis of the shaft, allowing said bearing retainer to hold the bearing in a fixed position with respect to said bearing retainer; and wherein said elastic section comprises an oblique subsection adjacent said ring section, and a cylindrical subsection adjacent said oblique subsection, wherein said oblique subsection comprises a wall which is slanted with respect to the shaft of the pump, and said cylindrical subsection comprises a wall which is parallel to the shaft of the pump.

10. The bearing retainer according to claim 9, wherein said multiple resilient parts allows receiving and supporting the bearing at a first temperature, thereby creating a compression force in radial direction perpendicular to the shaft, and wherein said multiple resilient parts allows maintaining a compression force in radial direction perpendicular to the shaft at a temperature higher than said first temperature.

11. The bearing retainer according to claim 9, wherein said multiple resilient parts are adapted to allow said bearing retainer to remain in contact with the bearing when the temperature changes.

12. The bearing retainer according to claim 9, wherein said bearing retainer has a first end and a second end opposite said first end in an axial direction, and further has a center positioned in the middle between said first end and said second end, and wherein said bearing retainer has a smaller external diameter at said center of said bearing retainer than the external diameter at said ends of said bearing retainer.

13. The bearing retainer according to claim 9, wherein said multiple slits have a length to wide ratio of at least 5:1.

14. The bearing retainer according to claim 9, wherein said multiple slits extend into said oblique subsection of said elastic section.

* * * * *